(12) United States Patent
Lee

(10) Patent No.: US 12,734,404 B2
(45) Date of Patent: Sep. 15, 2026

(54) METHOD, DEVICE, AND NON-TRANSITORY COMPUTER-READABLE RECORDING MEDIUM FOR ESTIMATING INFORMATION ON GOLF SWING

(71) Applicant: MOAIS, INC., Seoul (KR)

(72) Inventor: Yong Geun Lee, Seoul (KR)

(73) Assignee: MOAIS, INC., Seoul (KR)

( * ) Notice: Subject to any disclaimer, the term of this patent is extended or adjusted under 35 U.S.C. 154(b) by 432 days.

(21) Appl. No.: 17/768,019

(22) PCT Filed: Sep. 24, 2020

(86) PCT No.: PCT/KR2020/012997

§ 371 (c)(1),
(2) Date: Apr. 11, 2022

(87) PCT Pub. No.: WO2021/075753

PCT Pub. Date: Apr. 22, 2021

(65) Prior Publication Data

US 2023/0285802 A1 Sep. 14, 2023

(30) Foreign Application Priority Data

Oct. 16, 2019 (KR) ........................ 10-2019-0128551

(51) Int. Cl.
*G06K 9/00* (2022.01)
*A63B 24/00* (2006.01)
(Continued)

(52) U.S. Cl.
CPC ...... *A63B 24/0006* (2013.01); *A63B 24/0003* (2013.01); *A63B 69/3629* (2020.08);
(Continued)

(58) Field of Classification Search
CPC ........ G06V 10/22; G06V 10/34; G06V 10/70; G06V 10/74; G06V 10/75; G06V 10/751;
(Continued)

(56) References Cited

U.S. PATENT DOCUMENTS 7,857,708 B2 * 12/2010 Ueda .................. A63B 69/3658 382/103
11,494,938 B2 * 11/2022 Fu .......................... G06V 10/82
(Continued)

FOREIGN PATENT DOCUMENTS

KR 1020030085275 A 11/2003
KR 1020090105031 A 10/2009
(Continued)

OTHER PUBLICATIONS

International Search Report of PCT/KR2020/012997 dated Mar. 17, 2021.

*Primary Examiner* — Eric Rush
(74) *Attorney, Agent, or Firm* — Dinsmore & Shohl LLP; Yongsok Choi, Esq.

(57) ABSTRACT

A method for estimating information on a golf swing is provided. The method includes the steps of: when a photographed image of a user's golf swing is acquired, detecting at least one joint of the user from the photographed image using an artificial neural network model; comparing the user's golf swing and a golf swing of a comparison target with reference to a position of the at least one detected joint; and estimating information on the user's golf swing on the basis of a result of the comparison.

13 Claims, 3 Drawing Sheets

(51) Int. Cl.

| | |
|---|---|
| ***A63B 69/36*** | (2006.01) |
| ***G06T 7/246*** | (2017.01) |
| ***G06T 7/73*** | (2017.01) |
| ***G06V 10/70*** | (2022.01) |
| ***G06V 10/82*** | (2022.01) |
| ***G06V 40/10*** | (2022.01) |
| ***G06V 40/20*** | (2022.01) |
| *A63B 102/32* | (2015.01) |

(52) U.S. Cl.

CPC ................ *G06T 7/248* (2017.01); *G06T 7/74* (2017.01); *G06V 10/70* (2022.01); *G06V 10/82* (2022.01); *G06V 40/103* (2022.01); *G06V 40/23* (2022.01); *A63B 2024/0009* (2013.01); *A63B 2024/0012* (2013.01); *A63B 2102/32* (2015.10); *A63B 2220/05* (2013.01); *A63B 2220/10* (2013.01); *A63B 2220/16* (2013.01); *A63B 2220/807* (2013.01); *G06T 2207/20084* (2013.01); *G06T 2207/30196* (2013.01); *G06T 2207/30221* (2013.01)

(58) Field of Classification Search

CPC .. G06V 10/752; G06V 10/757; G06V 10/761; G06V 10/82; G06V 40/10; G06V 40/103; G06V 40/20; G06V 40/23; G06V 2201/07; G06T 7/20; G06T 7/246; G06T 7/248; G06T 7/30; G06T 7/32; G06T 7/33; G06T 7/337; G06T 7/60; G06T 7/70; G06T 7/73; G06T 7/74; G06T 7/97; G06T 2207/20081; G06T 2207/20084; G06T 2207/30196; G06T 2207/30221; G06N 3/08; A63B 24/0003; A63B 24/0006; A63B 24/0021; A63B 2024/0009; A63B 2024/0012; A63B 2024/0015; A63B 2024/0025; A63B 69/36; A63B 69/3605; A63B 69/3614; A63B 69/3623; A63B 69/3629; A63B 69/3632; A63B 69/3667; A63B 2102/32; A63B 2220/05; A63B 2220/10; A63B 2220/13; A63B 2220/16; A63B 2220/18; A63B 2220/20; A63B 2220/805; A63B 2220/806; A63B 2220/807; G01B 11/002; G01B 11/14; G01B 11/26

USPC ....... 382/100, 103, 107, 141, 152, 155–159, 382/181, 190, 209, 215–218, 224, 291, 382/325; 473/131, 150, 218, 219, 257, 473/258, 266, 270, 407, 409, 422, 516, 473/559; 434/252, 257, 258; 348/77, 348/135, 169–172; 702/150–153; 33/508; 704/200, 231, 232, 246, 251, 704/270, 275; 706/15, 25–27

See application file for complete search history.

(56) References Cited

U.S. PATENT DOCUMENTS

| | | | | |
|---|---|---|---|---|
| 2004/0209698 | A1* | 10/2004 | Ueda | G06T 7/20<br>473/150 |
| 2006/0040755 | A1* | 2/2006 | Choi | A63B 69/36<br>473/131 |
| 2006/0247070 | A1* | 11/2006 | Funk | A63B 69/3623<br>473/222 |
| 2006/0252018 | A1* | 11/2006 | Sooch | A63B 69/3614<br>434/252 |
| 2013/0316840 | A1* | 11/2013 | Marks | G06V 40/107<br>473/202 |
| 2017/0064214 | A1* | 3/2017 | Zhang | G06V 40/67 |
| 2019/0347826 | A1* | 11/2019 | Zhang | G06V 10/82 |
| 2020/0272888 | A1* | 8/2020 | Wang | G06V 40/103 |
| 2020/0320283 | A1* | 10/2020 | Lee | G06V 40/23 |
| 2021/0200993 | A1* | 7/2021 | Chen | G06V 10/82 |

FOREIGN PATENT DOCUMENTS

| | | | |
|---|---|---|---|
| KR | 1020120113945 | A | 10/2012 |
| KR | 1020160109570 | A | 9/2016 |
| KR | 1020190019824 | A | 2/2019 |
| KR | 1020190048693 | A | 5/2019 |

* cited by examiner

METHOD, DEVICE, AND NON-TRANSITORY COMPUTER-READABLE RECORDING MEDIUM FOR ESTIMATING INFORMATION ON GOLF SWING

CROSS REFERENCE TO RELATED APPLICATIONS

This application is a national phase of International Application No. PCT/KR2020/012997 filed on Sep. 24, 2020, which claims priority to Korean Patent Application No. 10-2019-0128551 filed on Oct. 16, 2019, the entire contents of which are herein incorporated by reference.

FIELD OF THE INVENTION

The present invention relates to a method, device, and non-transitory computer-readable recording medium for estimating information on a golf swing.

BACKGROUND

As golf has become popular recently, techniques for analyzing images of a golfer's swing and providing useful information to the golfer have been introduced.

As an example of related conventional techniques, Korean Laid-Open Patent Publication No. 2009-105031 discloses a golf clinic system employing image processing techniques and an operation method thereof, the system comprising: a plurality of markers attached to a body and a golf club of a golf practitioner; a plurality of cameras for collecting images of a swing motion of the golf practitioner; an image analyzer for reconstructing two-dimensional images collected from the plurality of cameras into three-dimensional images, extracting spatial coordinates of the markers according to movements, and analyzing angular values of parts of the body and data for each stage in real time to output a clinic result in a report format; and a database in which kinematic clinic information on the swing motion is matched with member information and stored as digital data.

However, according to the techniques introduced so far as well as the above-described conventional technique, it is necessary to separately use an expensive instrument for recognizing a golfer's posture and motion, or to attach separate sensors (or markers) to the golfer's body and golf club, in order to analyze the golfer's swing.

SUMMARY OF THE INVENTION

One object of the present invention is to solve all the above-described problems in prior art.

Another object of the invention is to detect at least one joint of a user from a photographed image of the user's golf swing using an artificial neural network model, compare the user's golf swing and a golf swing of a comparison target with reference to a position of the at least one detected joint, and estimate information on the user's golf swing on the basis of a result of the comparison.

Yet another object of the invention is to compare the user's golf swing and a golf swing of a comparison target with reference to a position of the at least one detected joint and at least one comparison point, and estimate information on the user's golf swing on the basis of a result of the comparison.

Still another object of the invention is to light-weight an artificial neural network model using depthwise convolution and pointwise convolution, and detect at least one joint of a user from a photographed image of the user's golf swing using the light-weighted artificial neural network model.

The representative configurations of the invention to achieve the above objects are described below.

According to one aspect of the invention, there is provided a method for estimating information on a golf swing, the method comprising the steps of: when a photographed image of a user's golf swing is acquired, detecting at least one joint of the user from the photographed image using an artificial neural network model; comparing the user's golf swing and a golf swing of a comparison target with reference to a position of the at least one detected joint; and estimating information on the user's golf swing on the basis of a result of the comparison.

According to another aspect of the invention, there is provided a device for estimating information on a golf swing, the device comprising: a joint detection unit configured to, when a photographed image of a user's golf swing is acquired, detect at least one joint of the user from the photographed image using an artificial neural network model; a golf swing comparison unit configured to compare the user's golf swing and a golf swing of a comparison target with reference to a position of the at least one detected joint; and a golf swing information estimation unit configured to estimate information on the user's golf swing on the basis of a result of the comparison.

In addition, there are further provided other methods and devices to implement the invention, as well as non-transitory computer-readable recording media having stored thereon computer programs for executing the methods.

According to the invention, it is possible to detect at least one joint of a user from a photographed image of the user's golf swing using an artificial neural network model, compare the user's golf swing and a golf swing of a comparison target with reference to a position of the at least one detected joint, and estimate information on the user's golf swing on the basis of a result of the comparison, thereby estimating the information on the user's golf swing with only the photographed image, without using any separate sensor or instrument.

According to the invention, it is possible to light-weight an artificial neural network model using depthwise convolution and pointwise convolution, and detect at least one joint of a user from a photographed image of the user's golf swing using the light-weighted artificial neural network model in a mobile device, thereby accurately and efficiently estimating the information on the user's golf swing in the mobile device, without using any separate sensor or instrument.

DETAILED DESCRIPTION

Figure 1:
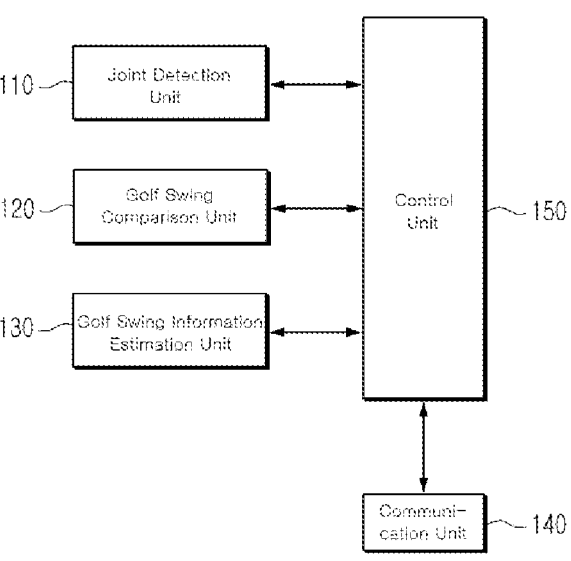
FIG. 1 specifically shows the internal configuration of a device according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Although embodiments related to a golf swing are described herein focusing on a full swing, the golf swing according to the invention should be understood in the broadest sense as encompassing all motions for moving a golf club. For example, the golf swing according to one embodiment of the invention may include a full swing, a half swing, a chip shot, a lobe shot, and a putt.

Although the descriptions herein are focused on golf, it will be apparent to those skilled in the art that the present invention may be utilized even for estimating information on motions performed in sports other than golf. For example, the present invention may be utilized for estimating information on a baseball swing or information on a workout or yoga posture.

Configuration of a Device

FIG. 1 specifically shows the internal configuration of a device according to one embodiment of the invention.

Hereinafter, the internal configuration of a device 100 crucial for implementing the invention and the functions of the respective components thereof will be discussed.

FIG. 1 specifically shows the internal configuration of the device 100 according to one embodiment of the invention.

As shown in FIG. 1, the device 100 according to one embodiment of the invention may comprise a joint detection unit 110, a golf swing comparison unit 120, a golf swing information estimation unit 130, a communication unit 140, and a control unit 150. According to one embodiment of the invention, at least some of the joint detection unit 110, the golf swing comparison unit 120, the golf swing information estimation unit 130, the communication unit 140, and the control unit 150 may be program modules to communicate with an external system. The program modules may be included in the device 100 in the form of operating systems, application program modules, or other program modules, while they may be physically stored in a variety of commonly known storage devices. Further, the program modules may also be stored in a remote storage device that may communicate with the device 100. Meanwhile, such program modules may include, but are not limited to, routines, subroutines, programs, objects, components, data structures, and the like for performing specific tasks or executing specific abstract data types as will be described below in accordance with the invention.

Meanwhile, the above description is illustrative although the device 100 has been described as above, and it will be apparent to those skilled in the art that at least a part of the components or functions of the device 100 may be implemented or included in an external system (not shown), as necessary.

Meanwhile, the device 100 according to one embodiment of the invention is digital equipment having a memory means and a microprocessor for computing capabilities, and may include smart phones, tablets, smart watches, smart bands, smart glasses, desktop computers, notebook computers, workstations, personal digital assistants (PDAs), web pads, and mobile phones. However, the device 100 is not limited to the examples mentioned above, and may be changed without limitation as long as the objects of the invention may be achieved.

Particularly, the device 100 may include an application (not shown) for assisting a user to receive services such as golf swing information estimation from the device 100. The application may be downloaded from a known web server (not shown).

First, the joint detection unit 110 according to one embodiment of the invention may function to, when a photographed image of a user's golf swing is acquired, detect at least one joint of the user from the photographed image using an artificial neural network model.

Specifically, the device 100 according to one embodiment of the invention may acquire a photographed image of a user's golf swing, wherein the photographed image of the user's golf swing may be photographed by the device 100, or may be photographed by another device (not shown) and provided to the device 100. Further, the joint detection unit 110 according to one embodiment of the invention may function to detect at least one joint of the user from the acquired photographed image of the user's golf swing using an artificial neural network model.

Here, the photographed image of the user's golf swing according to one embodiment of the invention may be an RGB image. That is, the joint detection unit 110 according to one embodiment of the invention may detect at least one joint of the user using only an RGB image of the user's golf swing, without using depth information acquired from an instrument such as a depth camera or a depth sensor.

Further, the at least one detected joint of the user according to one embodiment of the invention may be detected by reconstructing the photographed image of the user's golf swing into a heat map image in the artificial neural network model. That is, at least one heat map image may be generated for each of at least one joint of the user, and the joint detection unit 110 according to one embodiment of the invention may detect each joint from the at least one generated heat map image. (For example, the position of the brightest point in each heat map image may be detected as the position of the corresponding joint.)

In addition, the at least one detected joint of the user according to one embodiment of the invention may be joints essentially required for estimating information on the user's golf swing. That is, when the information on the user's golf swing is estimated, the computational efficiency of the artificial neural network model may be improved by limiting the number of joints to be detected such that joints of relatively low importance are not detected.

Meanwhile, the artificial neural network model according to one embodiment of the invention may include, for example, a convolutional neural network (CNN) model, a recurrent neural network (RNN) model, a deep belief network (DBN) model, or an artificial neural network model in which the foregoing models are combined. However, the artificial neural network model according to one embodiment of the invention is not limited to those mentioned above, and may be diversely changed as long as the objects of the invention may be achieved.

Further, the artificial neural network model according to one embodiment of the invention may be a model that is light-weighted using depthwise convolution and pointwise convolution.

In addition, the artificial neural network model according to one embodiment of the invention may be a model that is light-weighted using a light-weighting algorithm such as pruning, weight quantization, and residual learning.

Specifically, since artificial neural network models commonly used in object recognition technology require a high level of computing resources to be consumed for a high level of recognition performance, it is often difficult to use such models in environments where only limited computing resources are provided (e.g., mobile devices). Therefore, according to one embodiment of the invention, an artificial neural network model may be light-weighted using depthwise convolution and pointwise convolution, and the light-weighted artificial neural network model may be used in a mobile device so that at least one joint of a user may be detected from a photographed image of the user's golf swing.

Here, the depthwise convolution according to one embodiment of the invention may refer to a convolution process in which a kernel is applied for each depth (i.e., each channel) of an input layer, in performing convolution in the artificial neural network model according to one embodiment of the invention. Meanwhile, since the method of operation using the applied kernel is the same as that of general convolution, a detailed description thereof will be omitted.

Further, the pointwise convolution according to one embodiment of the invention may refer to a convolution process in which a kernel of size 1×1×M (i.e., a kernel of width 1, height 1, and depth M) is applied for each point of an input layer, in performing convolution in the artificial neural network model according to one embodiment of the invention.

Figure 2A:
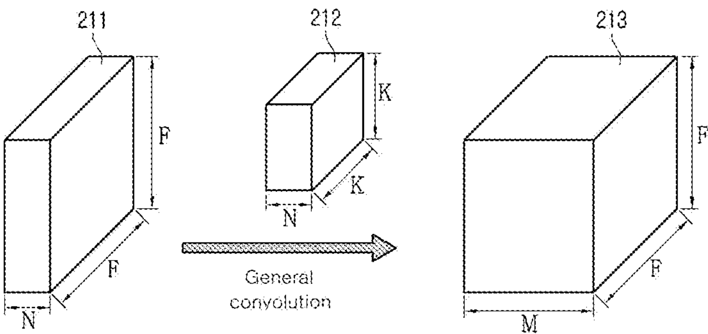
FIG. 2A illustratively shows how general convolution is performed according to one embodiment of the invention.

FIG. 2A illustratively shows how general convolution is performed according to one embodiment of the invention.

Figure 2B:
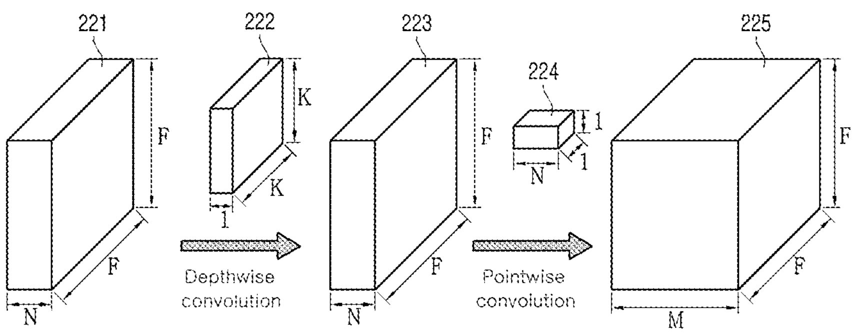
FIG. 2B illustratively shows how depthwise convolution and pointwise convolution are performed according to one embodiment of the invention.

FIG. 2B illustratively shows how depthwise convolution and pointwise convolution are performed according to one embodiment of the invention.

Referring to FIG. 2A, according to one embodiment of the invention, it may be assumed that the width, height, and depth of an input layer 211 are F, F, and N, respectively; the width, height, and depth of each kernel 212 are K, K, and N, respectively; and the width, height, and depth of an output layer 213 are F, F, and M, respectively. Here, it is assumed that padding and stride are appropriately sized such that there is no change in the width and height of the input layer 211 and the output layer 213. In this case, in the general convolution, the kernel 212 is applied to the input layer 211 to constitute one depth of the output layer 213 (through F×F×K×K×N operations), and these operations are performed for M kernels 212 so that a total of F×F×K×K×N×M operations are performed.

Referring to FIG. 2B, according to one embodiment of the invention, it may be assumed that the width, height, and depth of an input layer 221 are F, F, and N, respectively; the width, height, and depth of each kernel 222 in the depthwise convolution are K, K, and 1, respectively; the width, height, and depth of each kernel 224 in the pointwise convolution are 1, 1, and N, respectively; and the width, height and depth of an output layer 225 are F, F, and M, respectively. In this case, the kernel 222 is applied for each depth of the input layer 221 to constitute each depth of an intermediate layer 223 (through F×F×K×K×1×N operations). Then, the kernel 224 is applied for each point of the intermediate layer 223 to constitute one depth of the output layer 225 (through F×F×1×1×N operations), and these operations are performed for M kernels 224 so that a total of F×F×1×1×N×M operations are performed in the pointwise convolution. Therefore, according to one embodiment of the invention, a total of (F×F×K×K×1×N)+ (F×F×1×1×N×M) operations are performed in the depthwise convolution and the pointwise convolution, so that the amount of operations is reduced compared to the general convolution.

Meanwhile, the light-weighting algorithms according to one embodiment of the invention are not necessarily limited to the above algorithms (i.e., the depthwise convolution and the pointwise convolution), and the order or number of times of applying each of the above algorithms may also be diversely changed.

Next, the golf swing comparison unit 120 according to one embodiment of the invention may function to compare the user's golf swing and a golf swing of a comparison target with reference to a position of the at least one joint of the user detected by the joint detection unit 110 according to one embodiment of the invention.

Specifically, the golf swing comparison unit 120 according to one embodiment of the invention may function to estimate a posture of the user with reference to at least one of a type of the at least one joint of the user detected by the joint detection unit 110 according to one embodiment of the invention, a position of the at least one joint of the user, a distance between the at least one joint of the user and at least one other joint of the user, and an angle formed between the at least one joint of the user and at least one other joint of the user, and to compare the user's golf swing and the comparison target's golf swing with reference to the estimated posture.

Here, the golf swing of the comparison target according to one embodiment of the invention may refer to a golf swing of a person to be compared in order to estimate information on the user's golf swing. The golf swing of the comparison target may refer to a golf swing of the user photographed at a different point of time from the user's golf swing, or a golf swing of a person different from the user (e.g., the user's favorite golf player, a golf player having a similar body shape to the user, or another user desired to be compared).

Further, when at least one joint of the comparison target is detected from a photographed image of the golf swing of the comparison target, the golf swing comparison unit 120 according to one embodiment of the invention may function to compare the user's golf swing and the comparison target's golf swing with reference to a position of the at least one detected joint of the comparison target. Meanwhile, the descriptions given above or below in connection with detecting at least one joint of the user from the photographed image of the user's golf swing and using a position or the like of the at least one detected joint may be at least partially applied to detecting at least one joint of the comparison target from the photographed image of the comparison target's golf swing and using a position or the like of the at least one detected joint. However, in comparing the user's golf swing and the comparison target's golf swing, it is not necessarily required to detect at least one joint of the comparison target from the photographed image of the comparison target's golf swing, but the comparison may also be made using a different method (e.g., using a database in which information on the comparison target's golf swing is pre-stored).

In addition, the photographed image of the comparison target's golf swing may be photographed by the device 100, stored in an internal or external database (not shown), or collected from a known web. Moreover, the photographed image of the comparison target's golf swing may be an image of a golf swing of a golf player having a similar body shape to the user. Here, the golf player having the similar body shape to the user may be derived using information on the at least one joint detected from the photographed image of the user's golf swing. However, the photographed image of the comparison target's golf swing is not necessarily limited to those mentioned above, and may be diversely changed as long as the objects of the invention may be achieved.

Meanwhile, the golf swing comparison unit 120 according to one embodiment of the invention may function to compare the user's golf swing and the comparison target's golf swing with reference to a position of the at least one joint of the user detected by the joint detection unit 110 according to one embodiment of the invention and at least one comparison point.

Here, the comparison point according to one embodiment of the invention may refer to a reference or target of comparison in comparing the user's golf swing and the comparison target's golf swing. For example, the comparison point according to one embodiment of the invention may include, but is not limited to, a position of a specific joint, a position of a specific body part estimated from the specific joint, a reference line formed from the position of the at least one joint, and an angle formed from two or more reference lines.

Further, the comparison point according to one embodiment of the invention may be established separately for each partial motion constituting a golf swing.

Specifically, the golf swing according to one embodiment of the invention may be composed of eight stages of partial motions such as an address, a takeaway, a back swing, a top-of-swing, a down swing, an impact, a follow-through, and a finish. Further, the comparison point according to one embodiment of the invention may be established separately for each of the partial motions constituting the golf swing. Furthermore, even in the same partial motion, the comparison point according to one embodiment of the invention may be established separately for each point of view (e.g., a comparison point at the front, a comparison point at the side, and the like).

Further, with reference to at least one of a type of the at least one joint of the user detected by the joint detection unit 110 according to one embodiment of the invention, a position of the at least one joint of the user, a distance between the at least one joint of the user and at least one other joint of the user, and an angle formed between the at least one joint of the user and at least one other joint of the user, the golf swing comparison unit 120 according to one embodiment of the invention may derive to which of the above eight stages the photographed image of the user's golf swing corresponds, or extract at least one frame corresponding to a specific stage of the above eight stages from the photographed image of the user's golf swing. Accordingly, the golf swing comparison unit 120 according to one embodiment of the invention may function to compare the user's golf swing and the comparison target's golf swing separately for each partial motion constituting the golf swing.

Meanwhile, the golf swing according to one embodiment of the invention is not necessarily separated into the eight stages as described above. That is, it may be separated to further include detailed stages constituting each of the eight stages, or such that at least some of the eight stages constitute one stage.

Figures 5A, 5B:
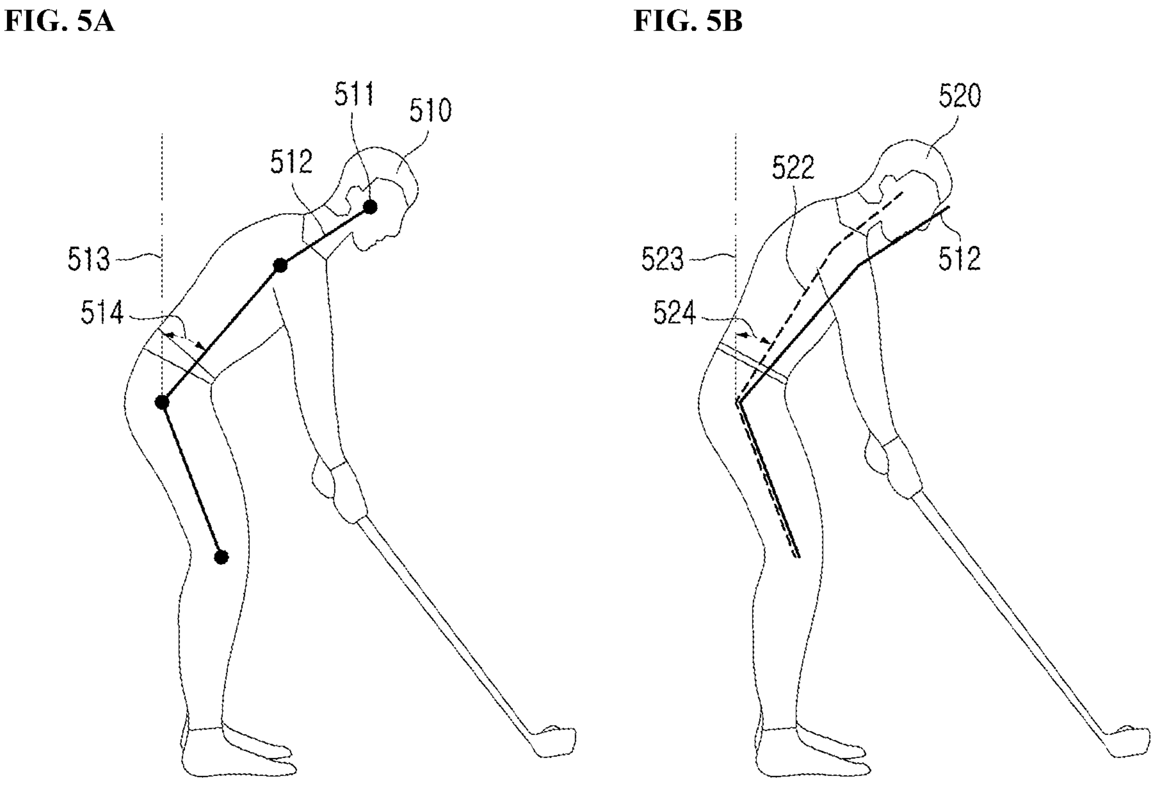
FIG. 5A illustratively shows how to compare a user's golf swing and a comparison target's golf swing with reference to at least one joint of the user detected according to one embodiment of the invention and at least one comparison point.
FIG. 5B illustratively shows how to compare a user's golf swing and a comparison target's golf swing with reference to at least one joint of the user detected according to one embodiment of the invention and at least one comparison point.

FIGS. 5A and 5B illustratively show how to compare a user's golf swing and a comparison target's golf swing with reference to at least one joint of the user detected according to one embodiment of the invention and at least one comparison point.

Referring to FIGS. 5A and 5B, according to one embodiment of the invention, it may be assumed that the comparison point is a waist bend angle in an address posture. In this case, the golf swing comparison unit 120 according to one embodiment of the invention may calculate a waist bend angle 514 in an address posture of a user 510 with reference to a position 511 of at least one joint of the user 510 detected by the joint detection unit 110 according to one embodiment of the invention, a line 512 formed by the joints, a reference line 513 for calculating the waist bend angle in the address posture, and the like. Further, the waist bend angle 514 in the address posture of the user 510 may be compared with a waist bend angle 524 in an address posture of a comparison target 520 to calculate a difference in the waist bend angle in the address posture between the user 510 and the comparison target 520.

Meanwhile, the golf swing comparison unit 120 according to one embodiment of the invention may function to estimate information on a golf club with reference to the position of the at least one joint of the user detected by the joint detection unit 110 according to one embodiment of the invention, and to compare the user's golf swing and the comparison target's golf swing with further reference to the estimated information on the golf club.

Specifically, the golf swing comparison unit 120 according to one embodiment of the invention may estimate the information on the golf club with reference to at least one of a type of the at least one joint of the user detected by the joint detection unit 110 according to one embodiment of the invention, a position of the at least one joint of the user, a distance between the at least one joint of the user and at least one other joint of the user, and an angle formed between the at least one joint of the user and at least one other joint of the user.

Further, the information on the golf club according to one embodiment of the invention may include, but is not limited to, a position of the golf club, an angle between a body part of the user and the golf club, and the like.

Figures 4A, 4B, 4C:
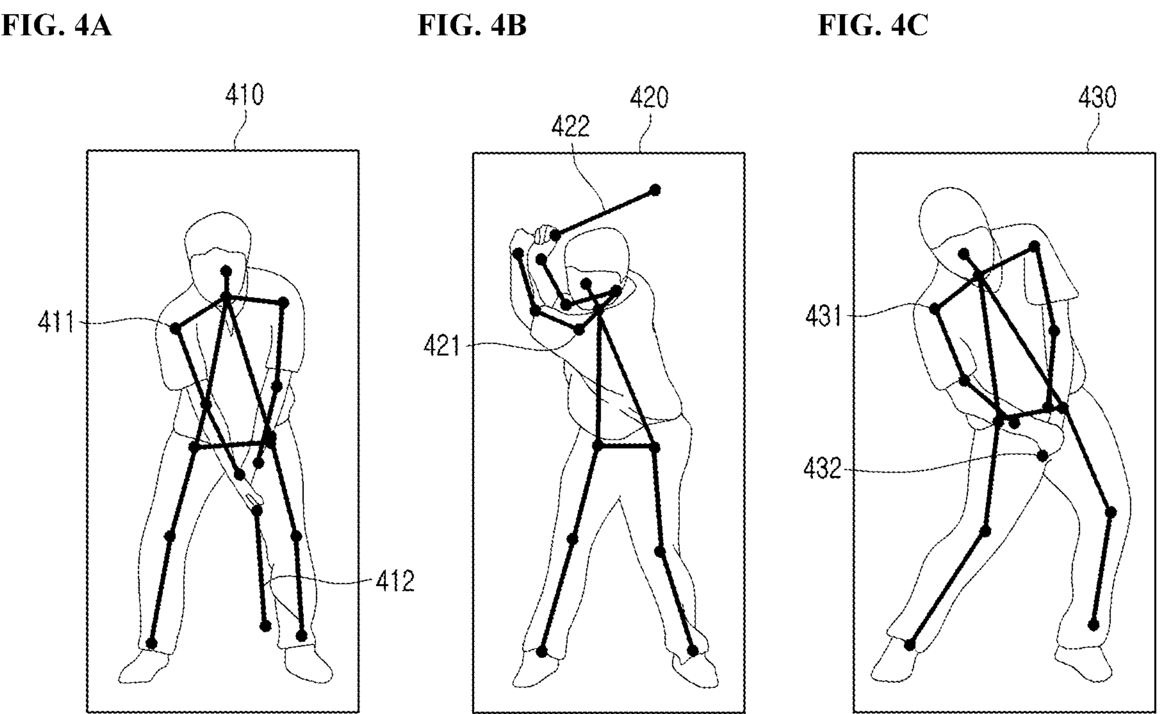
FIG. 4A illustratively shows a visual representation of at least one joint of a user detected according to one embodiment of the invention and information on a golf club estimated according to one embodiment of the invention.
FIG. 4B illustratively shows a visual representation of at least one joint of a user detected according to one embodiment of the invention and information on a golf club estimated according to one embodiment of the invention.
FIG. 4C illustratively shows a visual representation of at least one joint of a user detected according to one embodiment of the invention and information on a golf club estimated according to one embodiment of the invention.

FIGS. 4A to 4C illustratively show a visual representation of at least one joint of a user detected according to one embodiment of the invention and information on a golf club estimated according to one embodiment of the invention.

Referring to FIGS. 4A to 4C, according to one embodiment of the invention, photographed images 410, 420, and 430 of the user's golf swing may be acquired, and the photographed images may be RGB images photographed through the user's mobile device.

Referring further to FIGS. 4A to 4C, the joint detection unit 110 according to one embodiment of the invention may detect at least one joint 411, 421, and 431 of the user from the photographed images using an artificial neural network model that is light-weighted to be implemented in the mobile device. Further, the golf swing comparison unit 120 according to one embodiment of the invention may estimate a position and an angle 412, 422, and 432 of the golf club with reference to a position of the at least one detected joint.

Referring further to FIGS. 4A to 4C, the golf swing comparison unit 120 according to one embodiment of the invention may estimate a posture of the user with reference to the position of the at least one joint 411, 421, and 431 of the user detected by the joint detection unit 110 according to one embodiment of the invention. Further, the estimated posture may be estimated separately for each partial motion constituting the golf swing. For example, a posture in an address stage may be estimated in FIG. 4A, a posture in a top-of-swing stage may be estimated in FIG. 4B, and a posture in an impact stage may be estimated in FIG. 4C, respectively.

Meanwhile, according to one embodiment of the invention, storage of the photographed image may be started when a posture of the user estimated with reference to the position of the at least one joint detected by the joint detection unit 110 according to one embodiment of the invention satisfies a predetermined storage start condition, and the storage of the photographed image may be ended when the posture of the user satisfies a predetermined storage end condition.

Specifically, as described above, the golf swing comparison unit 120 according to one embodiment of the invention may estimate a posture of the user with reference to at least one of a type of the at least one joint of the user detected by the joint detection unit 110 according to one embodiment of the invention, a position of the at least one joint of the user, a distance between the at least one joint of the user and at least one other joint of the user, and an angle formed between the at least one joint of the user and at least one other joint of the user. Further, when the estimated posture of the user satisfies a predetermined storage start condition or a predetermined storage end condition, storage of the photographed image may be started or ended.

In addition, at least one of a predetermined storage start condition and a predetermined storage end condition according to one embodiment of the invention may be displayed on the device 100 in the form of guide lines and provided to the user.

Figure 3:
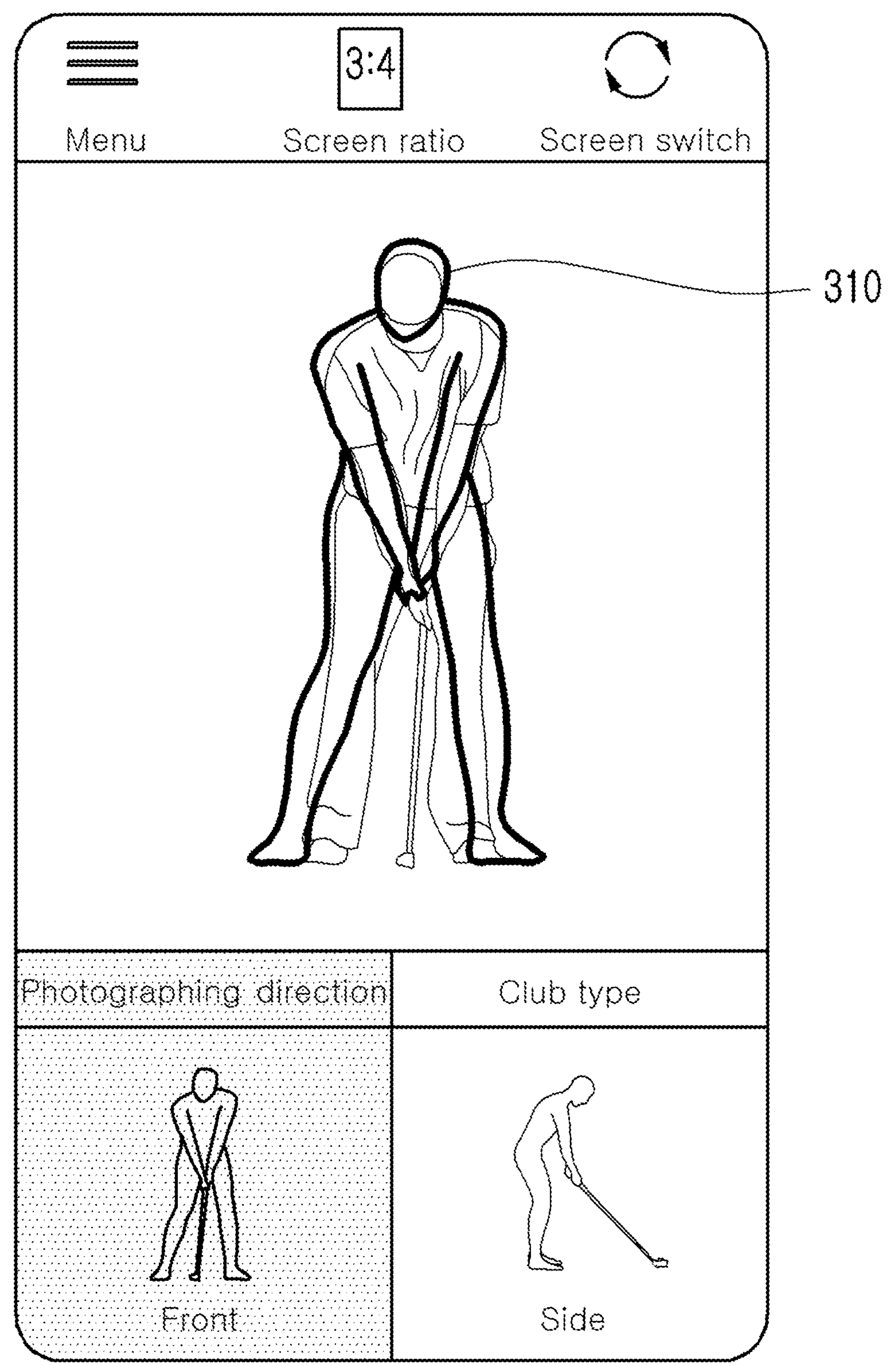
FIG. 3 illustratively shows a screen in which a storage start condition according to one embodiment of the invention is displayed in the form of guide lines and provided to a user.

FIG. 3 illustratively shows a screen in which a storage start condition according to one embodiment of the invention is displayed in the form of guide lines and provided to a user.

Referring to FIG. 3, according to one embodiment of the invention, the user may receive a storage start condition in the form of guide lines 310 through the device 100. Further, when the user's posture estimated by the golf swing information estimation unit 130 according to one embodiment of the invention is similar to the guide lines 310 at or above a predetermined level, the storage start condition is determined to be satisfied and storage of the photographed image may be started.

Meanwhile, when there is at least one frame that is determined to be unnecessary in estimating information on the user's golf swing from the stored image, a stored image management unit (not shown) according to one embodiment of the invention may function to cut out the at least one frame from the stored image.

For example, according to one embodiment of the invention, it may be assumed that a predetermined or longer time elapses while the user is in an address posture so that a predetermined number or more of frames corresponding to the address stage are included in the photographed image of the user's golf swing (i.e., the address posture is maintained too long so that unnecessary images are stored). In this case, the stored image management unit (not shown) according to one embodiment of the invention may leave only a predetermined number of frames preceding a frame in which a takeaway is started, and cut out other frames preceding the predetermined number of frames, among the frames corresponding to the address stage, from the stored image.

Next, the golf swing information estimation unit 130 according to one embodiment of the invention may function to estimate information on the user's golf swing on the basis of a result of comparing the user's golf swing and the comparison target's golf swing.

Specifically, the information on the user's golf swing according to one embodiment of the invention may include information on the user's swing speed, swing tempo, swing plane, cocking, swing posture, and the like. Further, the information on the user's golf swing may be estimated by comparing the user's golf swing and the comparison target's golf swing with reference to at least one joint of the user detected by the joint detection unit 110 according to one embodiment of the invention and at least one comparison point. However, the information on the golf swing according to one embodiment of the invention is not limited to those mentioned above, and may be diversely changed as long as the objects of the invention may be achieved.

Meanwhile, since the golf swing comparison unit 120 according to one embodiment of the invention may compare the user's golf swing and the comparison target's golf swing separately for each partial motion constituting the golf swing as described above, the information on the user's golf swing according to one embodiment of the invention may be estimated separately for each partial motion constituting the golf swing.

Referring to FIGS. 5A and 5B, according to one embodiment of the invention, it may be assumed that the comparison point is a waist bend angle in an address posture. In this case, the golf swing comparison unit 120 according to one embodiment of the invention may compare the waist bend angle 514 in the address posture of the user 510 and the waist bend angle 524 in the address posture of the comparison target 520 to calculate a difference in the waist bend angle in the address posture between the user 510 and the comparison target 520. Further, when the golf swing posture of the comparison target 520 is better than the golf swing posture of the user, the golf swing information estimation unit 130 according to one embodiment of the invention may estimate information indicating that it is desirable to reduce the waist bend angle (i.e., unbend the waist) by the calculated difference in the waist bend angle.

Meanwhile, according to one embodiment of the invention, at least one of the steps of detecting the at least one joint of the user from the photographed image, comparing the user's golf swing and the comparison target's golf swing with reference to the position of the at least one detected joint, and estimating the information on the user's golf swing on the basis of the result of the comparison may be performed according to a result of recognizing a voice from the user.

For example, according to one embodiment of the invention, a situation may be assumed in which information on a user's golf swing is estimated and provided to the user through the device 100. In this case, upon checking the provided information, the user may control the device 100 through a voice command, without operating the device 100 separately, such that the device 100 may perform at least one of the steps of detecting the at least one joint of the user from the photographed image, comparing the user's golf swing and the comparison target's golf swing with reference to the position of the at least one detected joint, and estimating the information on the user's golf swing on the basis of the result of the comparison.

Next, the communication unit 140 according to one embodiment of the invention may function to enable data transmission/reception from/to the joint detection unit 110, the golf swing comparison unit 120, and the golf swing information estimation unit 130.

Lastly, the control unit 150 according to one embodiment of the invention may function to control data flow among the joint detection unit 110, the golf swing comparison unit 120, the golf swing information estimation unit 130, and the communication unit 140. That is, the control unit 150 according to the invention may control data flow into/out of the device 100 or data flow among the respective components of the device 100, such that the joint detection unit 110, the golf swing comparison unit 120, the golf swing information estimation unit 130, and the communication unit 140 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

The recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a device for estimating information on a golf swing, the device comprising one or more processors and the method comprising the steps of:

by the one or more processors, light-weighting an artificial neural network model using depthwise convolution and pointwise convolution to obtain a light-weighted artificial neural network model;

by the one or more processors, when a photographed image of a user's golf swing is acquired, detecting at least one joint of the user from the photographed image using the light-weighted artificial neural network model;

by the one or more processors, estimating a posture of the user with reference to at least one of a type of the at least one joint of the user, a position of the at least one joint of the user, a distance between the at least one joint of the user and at least one other joint of the user, and an angle formed between the at least one joint of the user and at least one other joint of the user;

by the one or more processors, comparing the user's golf swing and a golf swing of a comparison target with reference to the posture of the user and at least one comparison point; and by the one or more processors, estimating information on the user's golf swing on the basis of a result of the comparison, wherein the at least one comparison point includes at least one of the position of the at least one joint, a position of a specific body part of the user estimated from the at least one joint, a reference line formed from the position of the at least one joint, and an angle formed from two or more reference lines, wherein the at least one comparison point is established separately for each partial motion constituting each of the user's golf swing and the comparison target's golf swing, and established separately for each point of view with respect to the same partial motion, wherein the user's golf swing and the comparison target's golf swing are constituted by a plurality of stages of partial motions, respectively, and similarity between the user's golf swing and the comparison target's golf swing is identified in consideration of the plurality of stages of partial motions, and wherein the method further comprises:

extracting at least one frame corresponding to each stage of the plurality of stages of the user's golf swing from photographed images of the user's golf swing;

determining a comparison point for the extracted at least one frame corresponding to each stage of the plurality of stages of the user's golf swing, wherein the comparison point is varied depending on the stage to which the extracted at least one frame corresponds, and for each stage of the plurality stages of the user's golf swing, the comparison point is determined separately for each point of view including a front view and a side view of the user's golf swing; and for each stage of the plurality of stages of the user's golf swing, comparing the comparison point for the extracted at least one frame corresponding to the stage of the user's golf swing to a target comparison point for a frame corresponding to a stage among the plurality of stages of the comparison target's golf swing corresponding to the stage of the user's golf swing, and wherein the plurality of stages include an address stage, a takeaway stage, a back swing stage, a top-of-swing stage, a down swing stage, an impact stage, a follow-through stage, and a finish stage.

2. The method of claim 1, wherein in the step of comparing the user's golf swing and the comparison target's golf swing, the comparison target's golf swing is a golf swing of the user photographed at a different point of time from the user's golf swing.

3. The method of claim 1, wherein in the step of comparing the user's golf swing and the comparison target's golf swing, information on a golf club is estimated with reference to at least one of the type of the at least one joint of the user, the position of the at least one joint of the user, the distance between the at least one joint of the user and at least one other joint of the user, and the angle formed between the at least one joint of the user and at least one other joint of the user, and the user's golf swing and the comparison target's golf swing are compared with further reference to the estimated information on the golf club.

4. The method of claim 1, wherein storage of the acquired photographed image is started when the posture of the user satisfies a predetermined storage start condition, and the storage of the acquired photographed image is ended when the posture of the user satisfies a predetermined storage end condition.

5. The method of claim 1, wherein at least one of the detecting step, the step of estimating the user's posture, the step of comparing the user's golf swing and the comparison target's golf swing, and the step of estimating the information on the user's golf swing is performed according to a result of recognizing a voice from the user.

6. The method of claim 1, wherein a depth of each kernel in the depthwise convolution is reduced to 1 and each of a width and a height of each kernel in the pointwise convolution is reduced to 1.

7. The method of claim 1, wherein the detecting step comprises the steps of:

reconstructing the photographed image into a heat map image for each of the at least one joint of the user using the light-weighted artificial neural network model; and detecting the at least one joint of the user by deriving the position of the at least one joint with reference to brightness values of points in each of the at least one heat map image, and wherein a number of joints to be detected is limited such that at least one joint of importance not lower than a predetermined level is detected among joints of the user.

8. The method of claim 1, wherein when the stage of the plurality of stages of the user's golf swing is the address stage, a waist bend angle is determined as the comparison point.

9. A non-transitory computer-readable recording medium having stored thereon a computer program that, when executed by a processor, causes the processor to perform the method of claim 1.

10. A device for estimating information on a golf swing, the device comprising one or more processors configured to:

light-weight an artificial neural network model using depthwise convolution and pointwise convolution to obtain a light-weighted artificial neural network model;

when a photographed image of a user's golf swing is acquired, detect at least one joint of the user from the photographed image using the light-weighted artificial neural network model;

estimate a posture of the user with reference to at least one of a type of the at least one joint of the user, a position of the at least one joint of the user, a distance between the at least one joint of the user and at least one other joint of the user, and an angle formed between the at least one joint of the user and at least one other joint of the user;

compare the user's golf swing and a golf swing of a comparison target with reference to the posture of the user and at least one comparison point; and estimate information on the user's golf swing on the basis of a result of the comparison, wherein the at least one comparison point includes at least one of the position of the at least one joint, a position of a specific body part of the user estimated from the at least one joint, a reference line formed from the position of the at least one joint, and an angle formed from two or more reference lines, wherein the at least one comparison point is established separately for each partial motion constituting each of the user's golf swing and the comparison target's golf swing, and established separately for each point of view with respect to the same partial motion, wherein the user's golf swing and the comparison target's golf swing are constituted by a plurality of stages of partial motions, respectively, and similarity between the user's golf swing and the comparison target's golf swing is identified in consideration of the plurality of stages of partial motions, and wherein the one or more processors are further configured to:

extract at least one frame corresponding to each stage of the plurality of stages of the user's golf swing from photographed images of the user's golf swing;

determine a comparison point for the extracted at least one frame corresponding to each stage of the plurality of stages of the user's golf swing, wherein the comparison point is varied depending on the stage to which the extracted at least one frame corresponds, and for each stage of the plurality stages of the user's golf swing, the comparison point is determined separately for each point of view including a front view and a side view of the user's golf swing; and for each stage of the plurality of stages of the user's golf swing, compare the comparison point for the extracted at least one frame corresponding to the stage of the user's golf swing to a target comparison point for a frame corresponding to a stage among the plurality of stages of the comparison target's golf swing corresponding to the stage of the user's golf swing, and wherein the plurality of stages include an address stage, a takeaway stage, a back swing stage, a top-of-swing stage, a down swing stage, an impact stage, a follow-through stage, and a finish stage.

11. The device of claim 10, wherein a depth of each kernel in the depthwise convolution is reduced to 1 and each of a width and a height of each kernel in the pointwise convolution is reduced to 1.

12. The device of claim 10, wherein the one or more processors are configured to:

reconstruct the photographed image into a heat map image for each of the at least one joint of the user using the light-weighted artificial neural network model; and detect the at least one joint of the user by deriving the position of the at least one joint with reference to brightness values of points in each of the at least one heat map image, and wherein a number of joints to be detected is limited such that at least one joint of importance not lower than a predetermined level is detected among joints of the user.

13. The device of claim 10, wherein when the stage of the plurality of stages of the user's golf swing is the address stage, a waist bend angle is determined as the comparison point.

* * * * *